(12) United States Patent
Hsu et al.

(10) Patent No.: US 12,124,312 B2
(45) Date of Patent: Oct. 22, 2024

(54) OUT-OF-BAND TRANSMISSIONS OF CONTROL SIGNALS

(71) Applicant: Hewlett-Packard Development Company, L.P., Spring, TX (US)

(72) Inventors: HengChang Hsu, Taipei (TW); Syed Azam, Spring, TX (US); Shih-Heng Chen, Taipei (TW); WanChieh Lu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 67 days.

(21) Appl. No.: 18/008,073

(22) PCT Filed: Jun. 4, 2020

(86) PCT No.: PCT/US2020/036105
§ 371 (c)(1),
(2) Date: Dec. 2, 2022

(87) PCT Pub. No.: WO2021/247028
PCT Pub. Date: Dec. 9, 2021

(65) Prior Publication Data
US 2023/0244292 A1    Aug. 3, 2023

(51) Int. Cl.
*G06F 1/00* (2006.01)
*G06F 1/3231* (2019.01)
*G06F 1/3296* (2019.01)

(52) U.S. Cl.
CPC .......... *G06F 1/3231* (2013.01); *G06F 1/3296* (2013.01)

(58) Field of Classification Search
CPC .... G06F 1/3231; G06F 1/3296; G06F 1/3234; Y02D 10/00
See application file for complete search history.

(56) References Cited

U.S. PATENT DOCUMENTS

| | | | |
|---|---|---|---|
| 9,746,904 B2 | 8/2017 | Adewale et al. | |
| 10,199,075 B2 | 2/2019 | Lin et al. | |
| 10,372,191 B2 | 8/2019 | Valko et al. | |
| 2006/0195699 A1 | 8/2006 | Liao et al. | |
| 2010/0031072 A1 | 2/2010 | Hung et al. | |
| 2013/0238918 A1 | 9/2013 | Haj-Yihia | |
| 2015/0134992 A1 | 5/2015 | Zhao | |
| 2016/0116960 A1 | 4/2016 | Kwak et al. | |
| 2016/0139647 A1 | 5/2016 | Choi | |
| 2019/0155364 A1* | 5/2019 | Chen | G06F 1/3265 |

* cited by examiner

*Primary Examiner* — Nitin C Patel
(74) *Attorney, Agent, or Firm* — Quarles & Brady LLP

(57) ABSTRACT

Out-of-band switching of states of a computing device by a coupled peripheral device, are described. A sensor within the peripheral device may monitor an area in proximity to the peripheral device. A controller within the peripheral device may determine whether a user is present within the area. On determining the user to be present, a control signal may be generated. The control signal is conforms with the messaging protocol and causes the computing device to switch between an operational state and a low-power state. The controller may cause out-of-band transmission of the control signal to the computing device through the transmission interface.

15 Claims, 5 Drawing Sheets

OUT-OF-BAND TRANSMISSIONS OF CONTROL SIGNALS

BACKGROUND

Computing devices when operational, may be used intermittently. While the computing device is not in use, it may switch from an operational state to a low-power state for conserving power, or a power-down state in which the computing device may enter a state of electronic hibernation, or in some cases, may be powered-off. Examples of such low-power state include, but are not limited to, the different power states as defined in Advanced Configuration and Power Interface (ACPI). The computing device may then be 'woken up' or switched back to the operational state when a triggering input is detected. For example, a manual input provided through a peripheral device, such as a click of a mouse or a pressing of a key on a keyboard coupled to the computing device may switch the computing device from any one of the low-power state to the operational state. However, the computing device may have to be rebooted in order to resume the computing device to the operational state from the power-down state.

BRIEF DESCRIPTION OF DRAWINGS

The following detailed description references the drawings, wherein.

Figure 1:
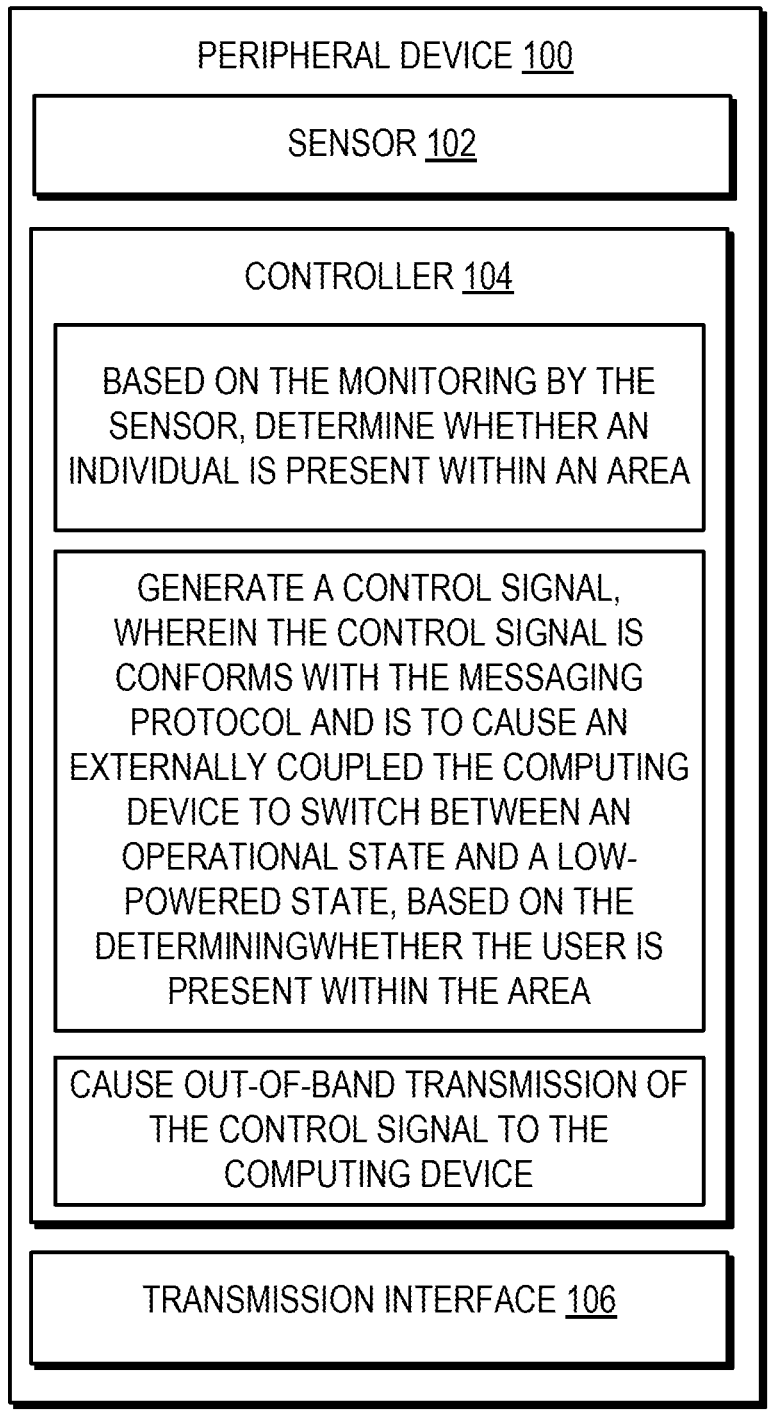
FIG. 1 illustrates a peripheral device for out-of-band switching of states of a computing device, according to an example of the present subject matter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing devices may alternate between an operational state and a low-power state depending on whether they are in use or not. While the computing device is in an operational state, all functionalities and features of the computing device may be available. However, the computing device may enter a low-power state if it has not been used for a predetermined amount of time. In such cases to conserve power, the computing device may be switched to a low-power state, after a predetermined time duration since the last user activity has elapsed. As the computing device enters a low-power state, a plurality of functionalities of the computing device may be suspended.

As such, a number of power states may be prescribed in which the computing device may persist depending on how long the computing device stays idle. Examples of such states include, but are not limited to, power states as defined in Advanced Configuration and Power Interface (ACPI) which include S0, S1, S2, S3, S4, and S5. S0 is the state in which the device is fully operational, with the processor executing predefined instructions. In successive states, various parts of the computing device may power down. For example, in S1 state the processor may stop processing instructions, but the power to the processor and the memory may still be maintained. S2 or S3 involves the processor being powered off, with computing device state, data or context being saved onto the RAM. S1 to S3 may be considered as a low-power states since the power consumption is less than the power consumed by the computing device when it is in an operational state.

During S4 and S5, the computing device may completely power down. During S4 (i.e., when the computing device enters a hibernate state), contents of the main memory of the computing device may be retained in the disk storage as the computing device is powered down. During the hibernate state, power consumption is reduced to the lowest levels prescribed for the computing device. During S5 (i.e., power-off state), the computing device is fully shut down. For both power down states, i.e., the hibernate state and the power-off state, the computing device reboots to resume functioning in the operational state.

The computing device may be woken up or switched to the operational state on detection of a triggering input. While in the operational state or any one of the low-power states, i.e., S1-S3 states, data lines, power rails, and other components may still be active and powered by the computing device, to allow transmission of the triggering input to the processor. As a result, any triggering input (e.g., mouse click, movement of the mouse, or a key strike of a keyboard) on being detected and may be transmitted through the data lines of the computing device to a control circuitry which is present within the computing device. In such instances, the transmission is considered to be in-band. This is because, such a transmission occurs over the data lines powered and handled by the computing device. The triggering input may be received through any peripheral device which is coupled to the computing device under consideration. As an example, such peripheral devices may communicate detection of the triggering input to the control circuitry through Universal Serial Bus (USB) based connections, and communication protocols.

While the computing device is in a power-down state, i.e., either the hibernate or power-off state, its data lines, power rails, and other components may be powered down or are in an inactive state. In such a case, no in-band signalling may be possible via the data lines of the computing device. This is because in the power down state, the data lines, power rails, and other components are not active to transmit the triggering input to the processor.

To such an extent, a user may have to manually initiate the booting up process (e.g., by pressing a start or power on button). In such a case, the actuation of the start button may further cause the control circuitry (i.e., the embedded controller or the power delivery controller) within the computing device to initiate the booting up process. The booting up process and returning of the computing device to its operational state may therefore take time. The controller, amongst other functions, may control the booting up process, as well as switching of the computing device between the low-power state and the operational state. The controller includes a processor resource (such as a microprocessor, a microcomputer, a microcontroller, and the like) and a memory resource on which instructions corresponding to a control program are stored.

Furthermore, even if the computing device is in the low-power state, a user may have to manually provide some input, for example, either by way of mouse click, touchpad stroke, or key press, to trigger the computing device to switch to the operational state. This may take time since the user may assume a seating position before they may manually provide a triggering input. The entire process of resuming the computing device to its operational state may again take time thereby preventing the user from using the computing device immediately.

Examples of a peripheral device for switching a state of a computing device to an operational state from either a low-power state or a power-down state, are described. The peripheral device may be externally coupled to the computing device through a transmission interface. The transmission interface supports a messaging protocol for communication of computing device-specific signals (such as vendor-defined messages), between the peripheral device and the embedded controllers of the computing device, which manage the states of the computing device. Furthermore, the computing device-specific signals communicated through the transmission interface are messaged or transmitted independently, or out-of-band, with respect to other data messaging that may occur between the peripheral device and the computing device.

In an example, the peripheral device powers and activates data lines of the computing device through the transmission interface. The peripheral device may generate control signals which may be transmitted to a control circuitry of the computing device via the transmission interface and over the data lines. Based on the control signals, the control circuitry of the computing device switches the state of the computing device. It may be noted that the data lines for transmitting the control signals from the peripheral device may differ from and independent of other data lines used for in-band messaging either between the peripheral device and the computing device, or within the components of the computing device. In such instances, since the data lines, through which the control signals may be transmitted, is powered by the peripheral device (and not by the computing device) and is independent of other data lines, such transmission of control signals may be said to occur out-of-band with respect to the other data lines. In an example, the control signals conforms to the messaging protocol supported by the transmission interface. An example of such a messaging protocol includes, but is not limited to, USB Power Delivery (PD) specification implementing power delivery (PD) messaging.

The peripheral device includes a sensor and a controller. Examples of such sensor include, but are not limited to, time of flight sensor, passive infrared (FIR) sensor, ultrasonic sensor, and other types of proximity sensors. In operation, the sensor within the peripheral device monitors an area. The monitored area may be such that it may be located in proximity of the computing device or the peripheral device. It may be the case that a user of the computing device may approach the computing device for using it. On approaching the computing device, the user may enter the monitored area. Based on the monitoring by the sensors, the controller determines the presence of an individual (i.e., the user) within the monitored area.

On determining the presence of the user within the monitored area, the controller of the peripheral device further generates control signals. In an example, the control signals may be transmitted to the control circuitry within computing device via the transmission interface, and over the data lines. With the control circuitry being active during the power-down state, on receiving the control signals, the control circuitry may cause to switch the computing device from the power-down state to an operational state. In an example, the control circuitry of the computing device includes an embedded controller, a power delivery controller, or a combination thereof. The control signals may be based either on certain predefined standards, or may be specifically defined by manufacturers of the peripheral device through vendor-defined messages.

The peripheral device, through its sensors, would be able to detect the presence of the user, as the user approaches the computing device. On detecting the presence of the user, the peripheral device provides the control signals over the transmission interface to the control circuitry of the computing device. The control circuitry initiates switching of computing device to the operational state. By the time, the user accommodates themselves before the computing device, switching of the computing device to the operational state may have completed. It may be noted that the peripheral device is externally coupled to the computing device. Since the peripheral device is externally couplable to the computing device, the peripheral device may be used for out-of-band transmission of control signals to switch states of any computing device which may be connected to the peripheral device.

In another example, the peripheral device may further monitor the monitored area to determine whether the user has moved away from the computing device. This may occur when the user moves away from the computing device to attend to some other allied tasks. To such an end, the sensor of the peripheral device is to monitor presence of the user within the monitored area. Based on the monitoring of the monitored area by the sensor, the controller may determine that the user has moved away from the computing device, and is no longer present within the monitored area. Accordingly, the controller may generate control signals which when processed by the computing device, switches the computing device from the operational state to the low-power state (e.g., any state between S1-S3), and subsequently to a power-down state (i.e., either a hibernate or powered-off state).

With respect to the present examples, it may be noted that the transmission of the control signals by the peripheral device is over the data lines of the computing device. The data lines of the computing device may be activated and powered by the peripheral device under circumstances when the computing device is in a power-down state. The transmission of control signals over the data line of the computing device powered by the peripheral device is out-of-band, when compared to transmission of other data lines which may generally be powered by the computing device, in instances when the computing device is in the operational state (i.e., in-band). The out-of-band transmission enables the peripheral devices to switch the states of a variety of computing devices, even in instances when the computing device is in the power-down state.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

The manner in which the example communication devices are implemented are explained in detail with respect to FIGS. 1-5. While aspects of described communication device may be implemented in any number of different electronic devices, environments, and/or implementations, the examples are described in the context of the following example device(s). It is to be noted that drawings of the present subject matter shown here are for illustrative purposes and are not to be construed as limiting the scope of the subject matter claimed.

FIG. 1 illustrates a peripheral device 100, according to an example. Examples of peripheral device 100 includes, but are not limited to, an external dock and an externally connected display. The peripheral device 100 may further include a sensor 102, a controller 104 and a transmission interface 106. The sensor 102 may include either a single sensor or may be implemented as a combination of multiple sensors. In an example, the sensor 102 may include a time-of-flight sensor, passive infrared sensor (PIR), ultrasonic sensor, microwave sensor, and an image capturing device. Other example sensors may be utilized without limiting the scope of the present subject matter.

The controller 104 may be a microprocessor, microcomputer, microcontroller, digital signal processor, central processing unit, state machine, logic circuitry, and/or any device that may manipulate signals based on certain operational instructions. Among other functions, the controller 104 is configured to fetch and execute the computer-readable instructions stored in a memory (not depicted in FIG. 1), for example, to enable the peripheral device 100 to generate control signals to switch a coupled computing device to an operational state. The controller 104 may perform a series of functions in response to execution of executable instructions provided within the peripheral device 100. For example, the controller 104 may manage power utilization or other functions of the peripheral device 100 during operation. The transmission interface 106 may include an interface supporting a messaging protocol between the peripheral device 100 and the computing device. The messaging protocol may be for communication of computing device-specific signals, such as control signals for the computing device, and for supply of power between the peripheral device 100 and the computing device. In effect, the transmission interface allows a connection for communication of control signals and supply of power from the peripheral device 100 to the computing device. The transmission interface 106 includes a connector provided within a housing of the peripheral device 100. In an example, the transmission interface 106 is a USB-C type interface. In the context of the USB-C type interfaces, the transmission interface 106 may further support messaging based on the USB Power Delivery (PD) specification, with the messaging being independent from (i.e., out-of-band) other data exchanges that may occur between the peripheral device 100 and the computing device.

In operation, the sensor 102 may monitor an area with respect to the peripheral device 100. The monitored area may be any area which is in proximity of the peripheral device 100, or the computing device (not shown in FIG. 1) to which the peripheral device 100 may be coupled to. The monitored area may be such area which would generally be occupied by a user when the user is either approaching or using the computing device. In an example, the size of the area to be monitored may be defined by a user of the peripheral device 100. Based on the monitoring of the monitored area by the sensor 102, the controller 104 may determine whether the user is physically present within the monitored area based on sensor data generated by the sensor 102. For example, the controller 104 may compare the sensor data with predefined values. Such predefined values may correspond to the sensor 102 sensing presence or absence of a user within the monitored area. Based on the comparison, the controller 104 may determine whether the user is present within the monitored area.

On determining the user to be present within the monitored area, the controller 104 may generate control signals. The control signals may then be transmitted to the computing device over the transmission interface 106. Through the transmission interface 106, the peripheral device 100 may be connected to the control circuitry of the computing device. Since the transmission interface 106 is capable of transmitting power, the peripheral device 100 may also power the control circuitry of the computing device.

The control signals are such that when processed and executed by the control circuitry of the computing device, may cause the computing device to switch between an operational state and either a low-power state or a power-down state. In an example, the low-power state may include one of S1-S3 states as defined in the ACPI specification. On the other hand, the power-down state may include a hibernate state or a power-off state. In an example, if the controller 104 determines the user to have moved into the monitored area, the control signals may cause the computing device to switch from the computing device from either the low-power state or the power-down state, to the operational state. In a similar manner, if the user moves away from the computing device and is no longer present in the monitored area, the controller 104 may generate control signals that may cause the state of the computing device to be switched from the operational state to the low-power state. In an example, the control signals may be based either on an industry standard, e.g., USB-C type specifications, or maybe specifically defined by manufacturers of the peripheral device through vendor-defined messages. Vendor-defined messages include non-standard commands added by vendors, such as manufacturers of the peripheral device 100. Such commands when executed implement varied functionality. For example, the Type-C Alt Mode specification of the USB-C type specification prescribes messaging protocols other than USB-based messaging to be transmitted over USB-based communication, through vendor-defined messages. In an example, the vendor-defined messages may be power delivery messages based on the USB Power Delivery (PD) protocol. In another example, the vendor-defined messages may further include wake interrupt signal generated by the peripheral device 100.

As may be noted, the control circuitry of the computing device may now be powered from the peripheral device 100 rather than its own power supply. Furthermore, the transmission interface 106 enables out-of-band transmission of control signals, as opposed to in-band switching which involves the computing device generating their own control signals which will be executed by the control circuitry of the computing device. These and other aspects are further described in conjunction with the remaining figures.

Figure 2:
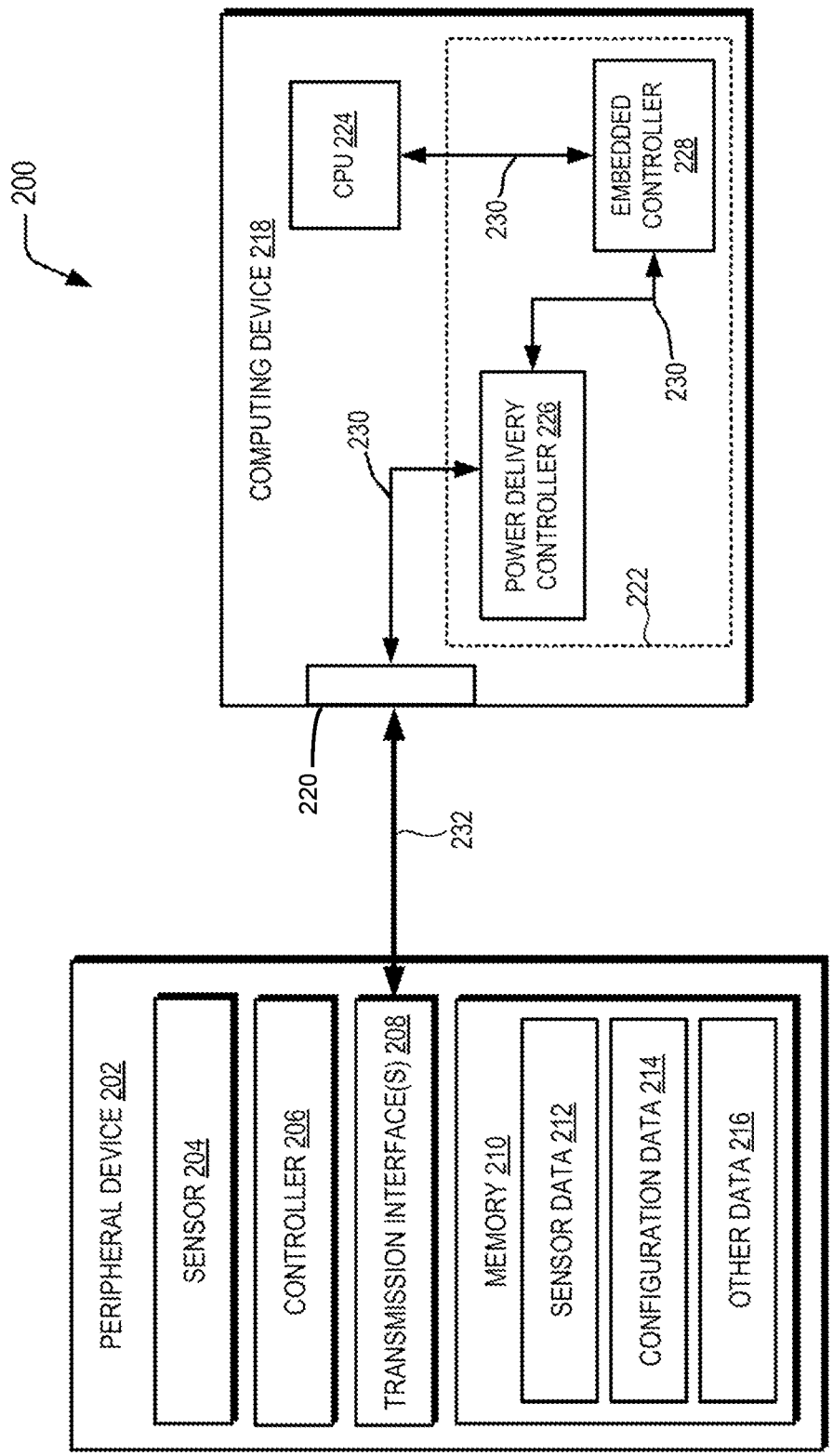
FIG. 2 illustrates a computing environment comprising a peripheral device for out-of-band switching of states of a computing device, according to another example of the present subject matter.

FIG. 2 illustrates a computing environment 200, comprising a peripheral device 202 for out-of-band switching of states of a computing device. The peripheral device 202 may be any device which may be externally coupled to a computing device. The peripheral device 202 includes a sensor 204, a controller 206, transmission interface(s) 208 and memory 210. The transmission interface(s) 208 may allow the connection or coupling of the peripheral device 202 to a computing device through a wired connection. The transmission interface(s) 208 conforms with a messaging protocol for communication and exchange of device-specific signals and power delivery to coupled devices. Examples of transmission interface(s) 208 include, but are not limited to, USB-C type interface, or Thunderbolt™ interface. It may be noted that the transmission interface(s) 208 may include other types of interfaces which may allow coupling through a wireless connection protocol (e.g., Bluetooth®, Wi-Fi). The transmission interface(s) 208 may enable intercommunication between different logical as well as hardware components of the peripheral device 202.

The memory 210 is a computer-readable medium, examples of which include volatile memory (e.g., RAM), and/or non-volatile memory (e.g., EPROM, flash memory, etc.). The memory 210 may be an external memory, or internal memory, such as a flash drive, a compact disk drive, an external hard disk drive, or the like. The memory 210 may further include data which either may be utilized or generated during the operation of the peripheral device 202. In an example, the memory 210 may include sensor data 212, configuration data 214, and other data 216. The sensor data 212 may include data that is generated by the sensor 204. On the other hand, configuration data 214 may specify a variety of predefined parameters that may be defined for the peripheral device 202. For example, the configuration data 214 may specify the dimensions of a monitored area which is to be monitored by the peripheral device 202.

Continuing with the present example, the peripheral device 202 is further coupled to a computing device 218. The computing device 218 may be any processor enabled device which is capable of performing certain functions in response to execution of computer-readable instructions. Few examples of such a computing device 218 include, but are not limited to, personal computer (PC), notebook PC, and a workstation. The computing device 218 may include port(s) 220, control circuitry 222, and a central processing unit 224. The control circuitry 222 may further include a power delivery controller 226 and an embedded controller 228, with the control circuitry 222 being connected to the port(s) 220. It may be noted that the computing device 218 may include other components, without deviating from the scope of the present subject matter. Such other components have not been depicted for sake of brevity of the present description. The same, however, should not be construed as a limitation. The various components of the computing device 218 may be further coupled to each other through data lines 230. The peripheral device 202 and the computing device 218 may be connected to each other through wired connection 232, through the transmission interface(s) 208 and the port(s) 220.

In operation, the sensor 204 of the peripheral device 202 may monitor, for example, continuously or periodically, an area which is in proximity of the computing device 218. In an example, the area may be the room or a portion of a room within which the computing device 218 may be located. It may be noted that the monitored area may be larger than the space occupied by the user, while the computing device 218 is being operated. Based on the monitoring, the sensor 204 may periodically generate sensor data 212. The sensor data 212 may be representative of the presence or absence of the user within the monitored area. The sensor data 212 may be processed at regular intervals to determine whether the user is present within the monitored area.

It may be the case that the user may have to attend to certain other tasks, owing to which the user may move away from the computing device 218, and outside the monitored area. In such a case, the sensor data 212 may, when processed by the controller 206, may indicate that the user is not present within the monitored area for a certain time, say for about 15 minutes. On determining the user to be away from the computing device 218 for a time duration that is greater than a predefined threshold, the controller 206 may perform certain power conservation functions on determining that the user is not present in the monitored area. For example, the controller 206 may generate control signals for controlling certain operational parameters, such as decreasing the brightness of the display of the computing device 218. Such power conservation functions may be performed across short time intervals until a first threshold time limit has been reached. In an example, the duration of the short time intervals and the first threshold time limit may be prescribed in the configuration data 214.

While the power conservation functions are being performed, the sensor 204 may continue to monitor the monitored area to determine whether the user has returned or not. After the threshold time limit has elapsed, the controller 206 may initiate switching the computing device 218 to one of the low-power states. In an example, the controller 206 may generate the control signals to switch the computing device 218 to one of the low-power states. To such an end, the controller 206 may generate the appropriate control signals and transmit the same via the transmission interface(s) 208 over a connection 232. The control signals transmitted by the peripheral device 202 may then be received by the embedded controller 228 of the computing device 218. The embedded controller 228 may accordingly provide the corresponding instructions to switch the computing device 218 to a low-power state, during which the computing device 218 may consume less power as compared to the power consumed while the computing device 218 was in the operational state. In an example, the computing device 218 may be switched to any one of the S1-S3 states as defined in the ACPI.

The sensor 204 within the peripheral device 202 continues to monitor the monitored area to check whether the user has returned to operate the computing device 218. If the user has not returned, say after a second threshold time limit has elapsed, the controller 206 may accordingly generate control signals to further switch the computing device 218 to a power-down state (i.e., the hibernate state or a power-off state). As described previously, in the hibernate state the computing device 218 may be powered down, and the contents of the main memory are saved in the disk storage of the computing device 218. On the other hand, the power-off state would involve powering off the computing device 218. During the power-down states, the control circuitry 222, i.e., the power delivery controller 226 and the embedded controller 228 remain active to detect actuation of the power button, should the user attempts to manually reboot or restart the computing device 218.

The peripheral device 202 may be powered through a separate power source (not shown in FIG. 2). To such an end, even while the computing device 218 is in the power-down state, the peripheral device 202 and its components may be active. In an example, the sensor 204 may continue to monitor the monitored area while the computing device 218 is in either the hibernate state or the power-off state. As the sensor 204 monitors the monitored area, it may continue to generate the sensor data 212 which may then be processed at regular intervals by the controller 206 to determine whether the user is present (i.e., having returned to the computing device 218). The present example is now described considering that the user is returning to the computing device 218. The monitored area is larger than the space occupied by the user while operating the computing device 218. Before the user reaches the computing device 218, the user will enter the monitored area. The sensor 204 of the peripheral device 202 may detect the presence of the user within the monitored area. The sensor 204 generates sensor data 212 which is then processed by the controller 206. The controller 206 based on sensor data 212, may determine that the user is present within the monitored area.

In some instances, the user may just be passing through as a result of which the sensor 204 may detect the user to be momentarily present within the monitored area. In such cases, the controller 206 may intermittently detect whether the user in fact continues to be present in the monitored area. In an example, the sensor 204 may detect the path traversed by the user within the proximity of the peripheral device 202. In response to the detected path, the sensor 204 may generate the path related sensor data 212. The path related sensor data 212 may then be processed by the controller 206 to determine whether the user is proceeding towards the computing device 218. On determining that the user is not proceeding towards the computing device 218, the controller 206 may not take any further action and may allow the computing device 218 to persist in the power-down state, i.e., hibernate state or the power-off state.

However, if the controller 206, based on the analysis of the path related sensor data 212, determines that the user is proceeding towards the computing device 218, the controller 206 may proceed forth to generate control signals for the computing device 218. In an example, the controller 206 may activate and power the data lines 230 via the transmission interface(s) 208. With the data lines 230 activated and powered, the control signals generated by the controller 206 may be transmitted over the connection 232 to the computing device 218. On being received by the computing device 218, the control signals may be routed to the control circuitry 222 of the computing device over the data lines 230. It is pertinent to note that the transmission of the control signals via the transmission interface(s) 208 and over the data lines 230 is out-of-band with respect to other data lines (not shown in FIG. 2) which may transmit triggering input when the computing device is in the operational state.

Thereafter, the control signals are received by the power delivery controller 226 over data lines 230, in an out-of-band manner. The power delivery controller 226 may accordingly process the control signals and initiate the powering-on of the computing device 218. In an example, the power delivery controller 226 may further activate the embedded controller 228 within the computing device 218. The embedded controller 228 may then execute firmware-based instructions within the computing device 218 to initiate the booting-up of the computing device 218. Once the booting-up process has completed, the computing device 218 assumes the operational state. The control signals received from the computing device 218 may be based either on certain predefined standards, or may be specifically defined by manufacturers of the peripheral device through vendor-defined messages.

In another example, the controller 206 may further implement certain other functions to identify inanimate objects from the user. In such cases, a combination of different sensors 204 may be used which accordingly provide different types of sensor data 212. For example, the sensor data 212 may provide any changes in temperature, image characteristics, or motion data, based on which the controller 206 may determine whether an object within the monitored area is the user or any other inanimate object located within the monitored area.

As evident through the above examples, any computing device (e.g., the computing device 218) may be woken up based on the presence of a user within the monitored area. The waking up of the computing device 218 is in turn controlled and managed by the peripheral device 202. Since the peripheral device 202 may be externally and separately connected to the computing device 218, such approaches may be implemented for any type or make of computing device. The peripheral device 202, operates in an out-of-band manner and even provides the extensibility in previous generation computing devices.

Figure 3:
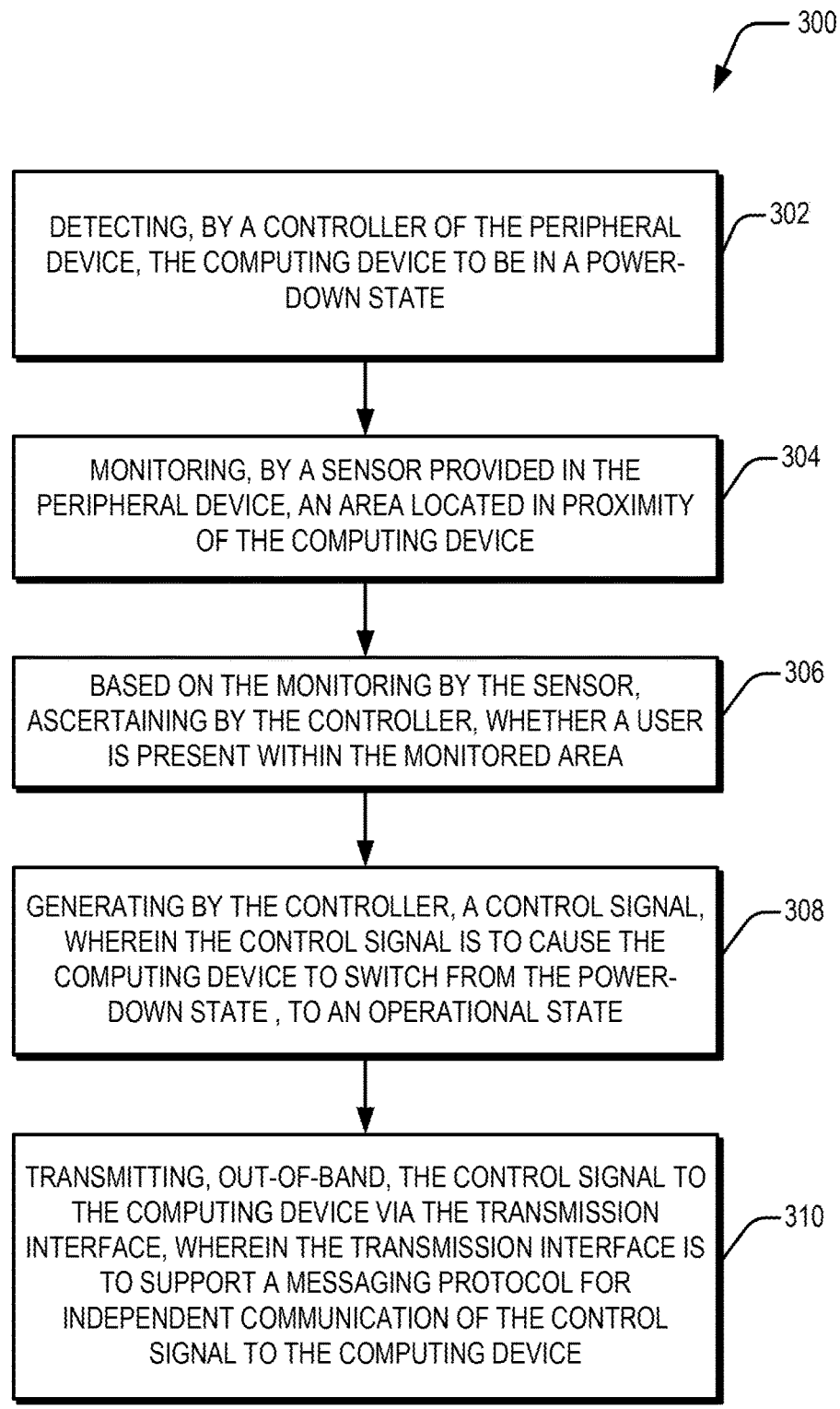
FIG. 3 illustrates a method for out-of-band switching of states of a computing device through a peripheral device, according to an example of the present subject matter.

FIG. 3 illustrates a method 300 performed by a peripheral device 202 for out-of-band switching of a computing device between a low-power state and an operational state, as per an example. Although the method 300 may be implemented for servicing of a variety of peripheral devices, for the ease of explanation, the present description of the example method 300 is provided in reference to the above-described peripheral device 202. The order in which the method 300 is described is not intended to be construed as a limitation, and any number of the described method blocks may be combined in any order to implement the method 300, or an alternative method.

The blocks of the method 300 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 3, at block 302, a computing device may be initially detected to be in a power-down state. While in a power-down state, the computing device may be in a state of electronic hibernation or may have been switched or powered off. In an example, the computing device, such as the computing device 218, may be coupled to a peripheral device, such as a peripheral device 202. The peripheral device 202 is externally coupled to the computing device 218 through a transmission interface(s) 208. In an example, the transmission interface(s) 208 may be a USB-C Type interface. Amongst other functions, the transmission interface(s) 208 may implement out-of-band transmission of control signals from the peripheral device 202 to the computing device 218.

At block 304, a sensor provided in a peripheral device, may monitor a monitored area in proximity of a computing device. In the present example, the peripheral device 202 may include a sensor 204 which may continuously monitor the monitored area. As the sensor 204 monitors the monitored area, it may further generate data which may be stored within the peripheral device 202, as sensor data 212.

At block 306, based on the monitoring by the sensor, a controller within the peripheral device may ascertain whether a user is present within the monitored area. For example, the controller 206 may process the sensor data 212 to determine whether the user is present in the monitored area or not. In the present example, the user may have been away from the computing device 218 for some time, owing to which the computing device 218 may have started operating in a power-down state, i.e., either in an electronic hibernation or may have been powered off.

At block 308, a control signal may be generated which is to cause the computing device to switch the computing device to an operational state, from the power-down state. For example, the controller 206 may determine, based on the processing of the sensor data 212, that the user is returning to the monitored area. On determining the same, the controller 206 may generate control signals. The control signals are such that when executed by the computing device 218, cause the computing device 218 to switch from the power-down state, to the operational state. In an example, the control signals may be specifically defined by manufacturers of the peripheral device through vendor-defined messages.

At block 310, the control signals may be transmitted, out-of-band, to the computing device through the transmission interface. In an example, the controller 206 may further transmit the control signals through the transmission interface(s) 208, to the computing device 218 via the connection 232. In an example, the transmission interface(s) 208 supports a messaging protocol for independent communication of the control signals from the peripheral device to the computing device. The communication of control signals is independent of other data exchanges between the peripheral device 202 and the computing device 218. The control signals transmitted by the peripheral device 202 may be received by the power delivery controller 226 of the computing device. Upon receipt of the control signals, the power delivery controller 226 may accordingly initiate the change in state of the computing device from the power-down state to the operational state.

Figure 4:
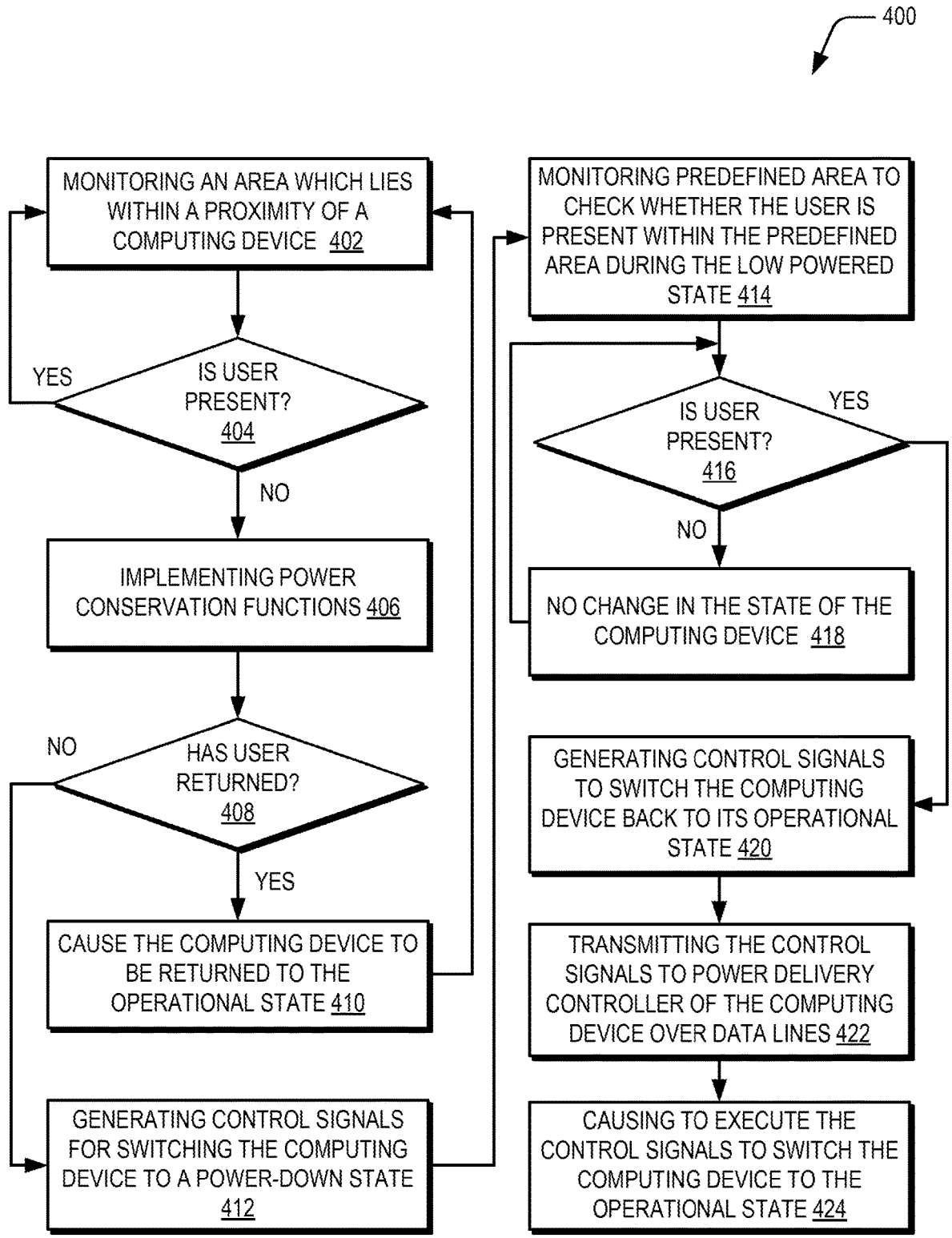
FIG. 4 illustrates a method for out-of-band switching of states of a computing device through a peripheral device, according to another example of the present subject matter.

FIG. 4 illustrates a method 400, performed by a peripheral device 202 for out-of-band switching of a computing device between a low-power state and an operational state, as per another example. The present example is explained in the context of the various functions implemented by the peripheral device 202. At block 402, a monitored area which lies within a proximity of a computing device is monitored. In an example, the peripheral device 202 may include sensor 204 which in turn may continuously monitor a monitored area in proximity of the computing device 218. The monitored area may be the room or a portion thereof, within which the computing device 218 may be located. During the course of their operation, the sensor 204 may result in sensor data 212.

At block 404, a determination may be made to ascertain whether the user is present before the computing device. For example, the controller 206 may process the sensor data 212 captured from the sensor 204 to ascertain whether the user is present within the monitored area or not. If it is determined that the user is present within the monitored area ('Yes' path from block 404), the method may loop back to block 402 wherein the peripheral device 202 (through the sensor 204) monitor the monitored area at regular intervals. In certain instances, the user may move away from the computing device and move away from the monitored area, for example, to attend to certain other tasks. In such cases, the controller 206 may determine that the user at such instances is not within the monitored area ('No' path from block 404). At this stage, the method proceeds to block 406.

At block 406, certain power conservation functions may be implemented. For example, the controller 206 on determining the user to be not present within the monitored area, may result in altering certain operational parameters of the computing device 218. In one example, the controller 206 may decrease the brightness of the display of the computing device 218 to conserve power. It may be noted that other operational parameters may also be altered without deviating from the scope of the present subject matter. In an example, the computing device 218 may be switched to a low-power state, e.g., any one of the states S1 to S3.

At block 408, the monitoring of the monitored area may further continue to detect whether the user has returned to the monitored area or not. On determining the user to have returned to the monitored area within a threshold time interval ('Yes' path from block 408), the peripheral device 202 may cause the computing device 218 to be returned to the operational state (block 410). Thereafter, the peripheral device 202 may resume monitoring the monitored area to determine whether the user has left the monitored area (path to block 402).

However, on determining that the user has not returned to the monitored area ('No' path from block 408), the peripheral device may generate control signals for switching the computing device to a power-down state, i.e., either the hibernate state or a power-off state (block 412). For example, the controller 206 may generate control signals for switching the computing device 218 to the power-down state. The control signals thus generated may be transmitted to the computing device 218. Once the computing device 218 receives the control signals, the embedded controller 228 may cause the CPU 228 of the computing device 218 to switch to a hibernate state or a power-off state.

Once the computing device is in the hibernate state or the power-off state, at block 414, the peripheral device may monitor the monitored area. At block 416, a further determination may be made to ascertain whether the user is present within the monitored area or not. If the user continues to be absent from the monitored area ('No' path from block 416), no change in state of the computing device 218 is performed (block 418). However, if the controller 206 determines that the user has returned to the monitored area to use the computing device 218 ('Yes' path from block 416), the controller 206 may generate control signals to switch the computing device 218 back to its operational state (block 420).

At block 422, the control signals are transmitted to the computing device. For example, the controller 206 may initially activate and power the data lines 230 of the computing device 218 through the transmission interface(s) 208. With the data lines 230 now activated, the control signals generated by the peripheral device 202 are transmitted over the connection 232 and data lines 230 to control circuitry 222 of the computing device 218 via the transmission interface(s) 208. The transmission interface(s) 208 is such that the control signals are based on a messaging protocol for independent communication of the control signals to the computing device. For example, the control signals are transmitted via the transmission interface(s) 208, over the connection 232 and the data lines 230, independently from other data exchanges (such as a triggering input) that may be occurring over other data lines of the computing device 218, when the computing device 218 is in the operational state. Thereafter, the control signals may be provided to the power delivery controller 226 within the control circuitry 222 of the computing device 218. In an example, the control signals may be communicated as vendor-defined messages. In an example, the vendor-defined messages may be Power Delivery (PD) messages based on the USB Power Delivery (PD) protocol of the USB-C type specification. In yet another example, the vendor-defined message may further include a wake interrupt signal generated by the peripheral device 202, and subsequently transmitted to the computing device 218, for switching the state of the computing device 218 to the operational state.

At block 424, the control signals may be caused to be executed by the computing device to switch the computing device to the operational state. As described previously, despite the computing device 218 being in power-down state, the control circuitry 222 comprising the power delivery controller 226 and the embedded controller 228 may still be active. In an example, the control signals are received by the power delivery controller 226 of the computing device 218. The power delivery controller 226 on receiving control signals may further activate the embedded controller 228 within the computing device 218. In response to activation by the power delivery controller 222, the embedded controller 228 may then execute firmware-based instructions (e.g., BIOS) within the computing device 218 to initiate the booting-up of the computing device 218. Once the booting-up is completed, the computing device 218 is in the operational state.

Figure 5:
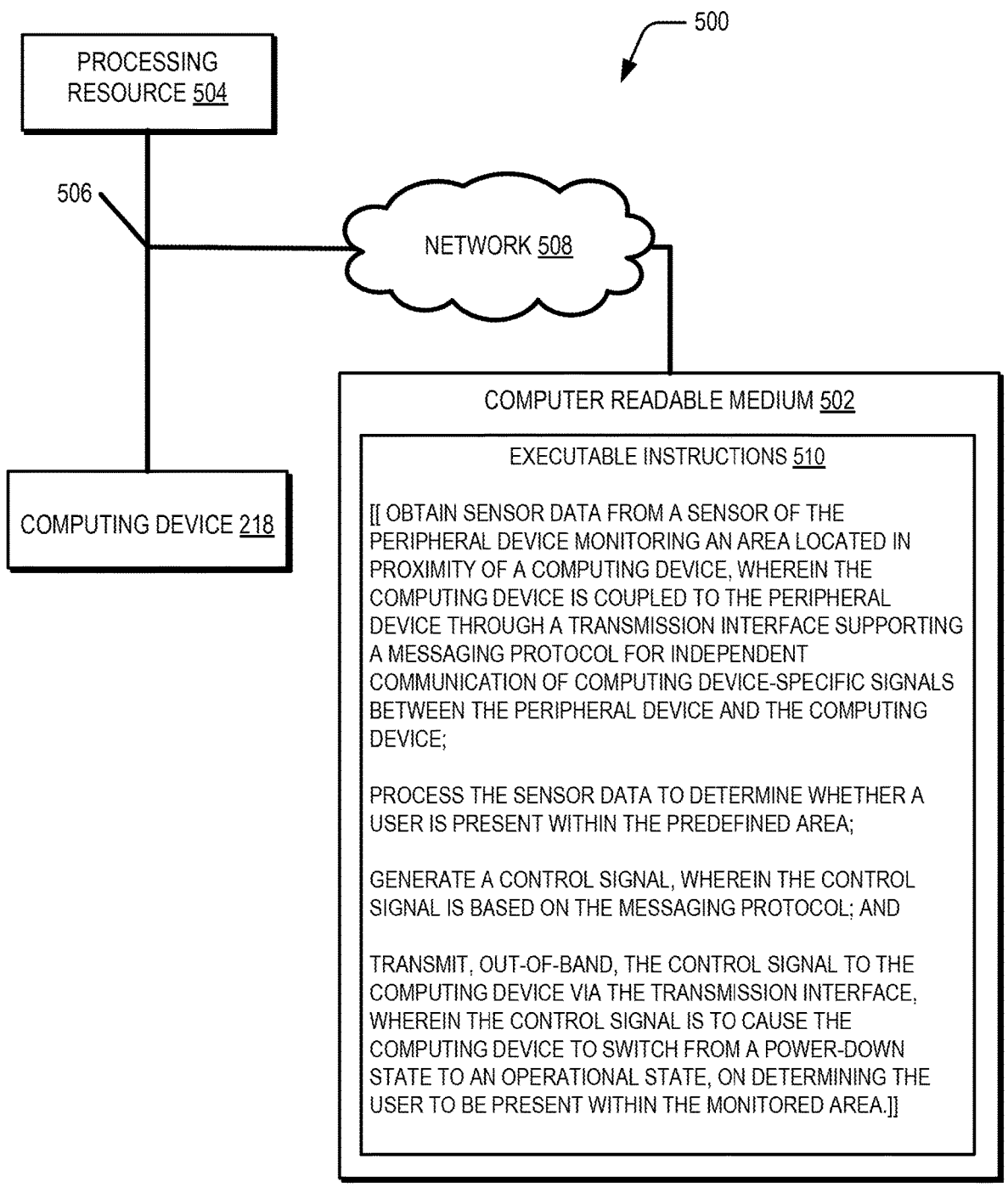
FIG. 5 illustrates a non-transitory computer-readable medium for implementing an out-of-band switching of states of a computing device through a peripheral device, according to an example of the present subject matter.

FIG. 5 illustrates a computing environment 500 implementing a non-transitory computer-readable medium 502 for switching the state of a computing device by a peripheral device, as per an example. In an example, the computing environment 500 may comprise the above-explained computing device 218. The computing environment 500 includes a processing resource 504 communicatively coupled to the non-transitory computer-readable medium 502 through a communication link 506. In an example, the processing resource 504 may be a processor or a controller within the peripheral device 202 that fetches and executes computer-readable instructions from the non-transitory computer-readable medium 502.

The non-transitory computer-readable medium 502 may be, for example, an internal memory device or an external memory device. In an example, the communication link 506 may be a direct communication link, such as any memory read/write interface. In another example, the communication link 506 may be an indirect communication link, such as a network interface. In such a case, the processing resource 504 may access the non-transitory computer-readable medium 502 through a network 508. The network 508 may be a single network or a combination of multiple networks and may use a variety of different communication protocols.

In an example, the non-transitory computer-readable medium 502 comprises executable instructions 510 for servicing a computing device 218. For example, the non-transitory computer-readable medium 502 may comprise executable instructions 510 to implement the functions performed by the peripheral device 202. The instructions 510 when executed may cause to obtain sensor data, such as sensor data 212, from a sensor, such as sensor 204, provided within the peripheral device 202. The sensor data 212 thus obtained corresponds to electrical signals generated by a sensor during the monitoring of an area which is in proximity of the computing device 218. Once the sensor data 212 is obtained, the instructions 510 may further cause the peripheral device 202 to process the sensor data 212 thus collected. In an example, the sensor data 212 from the sensor 204 is processed by the controller 206 within the peripheral device 202. Based on the processing, the peripheral device 202 may determine whether a user of the computing device 218 is present within the monitored area.

If the peripheral device 202 determines, based on the processing of the sensor data 212 that the user is present within the monitored area, the instructions 510 may further cause the peripheral device 202 to generate control signals. In an example, the control signal is based on a messaging protocol for independent communication of the control signal from the peripheral device 202, to the computing device 218. Such independent communication of the control signal provides an out-of-band transmission of the control signal, such that the control signal is transmitted independent of other data that may be exchanged between the peripheral device 202 and the computing device 218.

Once the control signals are generated, the instructions 510 may be further executed to cause the controller 206 to activate and power data lines, such as data lines 230 within the computing device 218. The instructions 510 may then be executed to cause an out-of-band transmission of the control signals to a power delivery controller 222 of a computing device 218 via a transmission interface, for example, transmission interface 106. In an example, the transmission interface 106 supports a messaging protocol for independent communication of computing device-specific control signals to the computing device 218. The control signals may then be executed by the power delivery controller 222 to switch the state of the computing device 218 between the operational state and the low-power state.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A peripheral device comprising:
   a sensor, wherein the sensor is to monitor an area in proximity to the peripheral device;
   a transmission interface to couple the peripheral device to a computing device, wherein the transmission interface is to support a messaging protocol for independent communication of computing device-specific signals between the peripheral device and the computing device;
   a controller to:
     based on the monitoring by the sensor, determine whether a user is present within the area;
     generate a control signal, wherein the control signal is to conform with the messaging protocol and is to cause the computing device to switch between an operational state and a low-power state, based on whether the user is present within the area; and
     cause out-of-band transmission of the control signal to the computing device through the transmission interface.

2. The peripheral device as claimed in claim 1, wherein the controller is to further:
   determine whether the user has moved beyond the area based on the monitoring by the sensor; and
   generate, when the computing device is in the operational state, the control signal to cause the computing device to switch from the operational state to the low-power state, in response to the user having moved beyond the area.

3. The peripheral device as claimed in claim 1, wherein the controller is to generate the control signal to further:
   determine whether the user has moved into the area based on the monitoring by the sensor; and
   generate, when the computing device is in a power-down state, the control signal to cause the computing device to switch from the power-down state to the operational state, in response to the user having moved into the area.

4. The peripheral device as claimed in claim 3, wherein the power-down state comprises a hibernate state or a power-off state.

5. The peripheral device as claimed in claim 1, wherein the control signals are vendor-defined messages.

6. The peripheral device as claimed in claim 1, wherein the sensor is a time-of-flight sensor, passive infrared sensor (PIR), ultrasonic sensor, microwave sensor, or an image capturing device.

7. The peripheral device as claimed in claim 1, wherein the transmission interface is a USB-C type interface.

8. A method for controlling a computing device coupled to a peripheral device, the method comprising:
    detecting, by a controller of the peripheral device, the computing device to be in a power-down state, wherein the power-down state comprises a hibernate state and power-off state;
    monitoring, by a sensor provided in the peripheral device, an area located in proximity of the computing device;
    based on the monitoring by the sensor, ascertaining by the controller, whether a user is present within the monitored area;
    generating by the controller, a control signal, wherein the control signal is to cause the computing device to switch from the power-down state, to an operational state; and
    transmitting, out-of-band, the control signal to the computing device via the transmission interface, wherein the transmission interface is to support a messaging protocol for independent communication of the control signal from the peripheral device to the computing device.

9. The method as claimed in claim 8, further comprising determining whether the user is present within the monitored area for a threshold time interval.

10. The method as claimed in claim 8, wherein the monitoring further comprises:
    scanning the monitored area to generate scanning data;
    processing the scanning data to determine presence of an object within the monitored area; and
    identifying the object as the user based on a predefined criteria.

11. The method as claimed in claim 8, wherein the determining comprises:
    detect a path traversed by the user within the area; and
    based on the detected path, ascertaining whether the user is proceeding towards the computing device.

12. The method as claimed in claim 11, wherein the generating the control signal comprises:
    generating the control signal in the form of a vendor-defined message conforming with the messaging protocol; and
    transmitting the vendor-defined message via the transmission interface.

13. A non-transitory computer-readable medium comprising computer-readable instructions, which when executed by a controller, cause a peripheral device to:
    obtain sensor data from a sensor of the peripheral device, wherein the sensor is to monitor an area located in proximity of a computing device and the computing device is coupled to the peripheral device through a transmission interface that supports a messaging protocol for independent communication of computing device-specific signals between the peripheral device and the computing device;
    process the sensor data to determine whether a user is present within the monitored area;
    generate a control signal, wherein the control signal is based on the messaging protocol; and
    transmit, out-of-band, the control signal to the computing device via the transmission interface, wherein the control signal is to cause the computing device to switch from a power-down state to an operational state, on determining the user to be present within the monitored area.

14. The non-transitory computer-readable medium as claimed in claim 13, wherein the instructions are to process the sensor data to differentiate an inanimate object from the user in the monitored area.

15. The non-transitory computer-readable medium as claimed in claim 13, wherein the control signal is a vendor-defined message based on USB Power Delivery (PD) specification.

* * * * *